(12) United States Patent
Malmberg et al.

(10) Patent No.: US 9,369,004 B2
(45) Date of Patent: Jun. 14, 2016

(54) INDUCTIVE-CHARGING GROMMET FOR FURNITURE

(71) Applicant: L&P PROPERTY MANAGEMENT COMPANY, South Gate, CA (US)

(72) Inventors: John Malmberg, Joplin, MO (US); Caleb Browning, Carthage, MO (US); Jason Turner, Joplin, MO (US)

(73) Assignee: L & P Property Management Company, South Gate, CA (US)

( * ) Notice: Subject to any disclaimer, the term of this patent is extended or adjusted under 35 U.S.C. 154(b) by 170 days.

(21) Appl. No.: 14/314,856

(22) Filed: Jun. 25, 2014

(65) Prior Publication Data
US 2015/0380969 A1    Dec. 31, 2015

(51) Int. Cl.
*H02J 7/00* (2006.01)
*H02J 7/02* (2016.01)

(52) U.S. Cl.
CPC .............. *H02J 7/025* (2013.01); *H02J 7/0042* (2013.01); *H02J 7/0047* (2013.01)

(58) Field of Classification Search
CPC ........ H02J 7/025; H02J 7/0047; H02J 7/0042
USPC .......................................................... 320/108
See application file for complete search history.

(56) References Cited

U.S. PATENT DOCUMENTS

| | | | | |
|---|---|---|---|---|
| 2013/0257363 | A1* | 10/2013 | Lota | H02J 7/0047 320/108 |
| 2013/0285601 | A1* | 10/2013 | Sookprasong | H02J 7/025 320/108 |
| 2015/0097519 | A1* | 4/2015 | Chen | H02J 7/025 320/108 |

\* cited by examiner

*Primary Examiner* — Vuthe Siek
(74) *Attorney, Agent, or Firm* — Shook, Hardy & Bacon L.L.P.

(57) ABSTRACT

An inductive-charging device mounts into a through hole of a furniture item, such as a desk. The device generally includes a housing that mounts into the through hole and that provides a compartment for a controller, primary coil, and other electronic components used to provide inductive charging. The device might be mounted so that it at least partially extends above a work surface of a desk. Alternatively, a top of the device might be flush with the work surface.

20 Claims, 4 Drawing Sheets

INDUCTIVE-CHARGING GROMMET FOR FURNITURE

BACKGROUND

Managing cords and wires of electronic devices is an issue often faced by consumers. Various strategies are used to try and either organize these cables or eliminate the need for them altogether. For example, furniture is often constructed with through holes that allow cables to pass from one device to another or to pass from a device to a power source. In addition, these through holes can be outfitted with power strips or other types of inserts to assist with cable organization. Other strategies try to eliminate the need for cables altogether. For example, inductive chargers have been developed that allow an electronic device to be wirelessly charged.

SUMMARY

In brief, and at a high level, an embodiment of the present invention is directed to an inductive-charging device that mounts into a through hole of a furniture item, such as a desk. The device generally includes a housing that mounts into the through hole and that provides a compartment for a controller, primary coil, and other electronic components used to provide inductive charging. The device might be mounted so that it at least partially extends above a work surface of a desk. Alternatively, a top of the device might be flush with the work surface.

This high-level overview of various aspects of the invention is provided here to introduce a selection of concepts that are further described below in the detailed-description section. This summary is not intended to identify key or essential features of the claimed subject matter, nor is it intended to be used as an aid in isolation to determine the scope of the claimed subject matter.

BRIEF DESCRIPTION OF THE DRAWINGS

Illustrative embodiments of the present invention are described in detail below with reference to the attached figures, which are incorporated herein by reference, wherein.

DETAILED DESCRIPTION

The subject matter of select embodiments of the present invention is described with specificity herein to meet statutory requirements. But the description itself is not intended to define what is regarded as the invention; rather, the claims define the invention. The claimed subject matter might be embodied in other ways to include different elements or combinations of elements similar to the ones described in this document, in conjunction with other present or future technologies.

The present invention is generally directed to an inductive-charging device (also referred to herein as "device" for shorthand) that mounts into a through hole of a furniture item, such as a desk. The device includes a housing that fits into the through hole and encases components, which provide inductive-charging functionality. In one embodiment, the housing mounts into the through hole and a lid or lip of the housing extends above a top surface (e.g., work surface or exposed surface) of the furniture—also known as a "surface mount". In another embodiment, the device is mounted such that a top surface of the housing lid is flush with the top or exposed surface of the furniture item—also known as a "flush mount".

Figure 1:
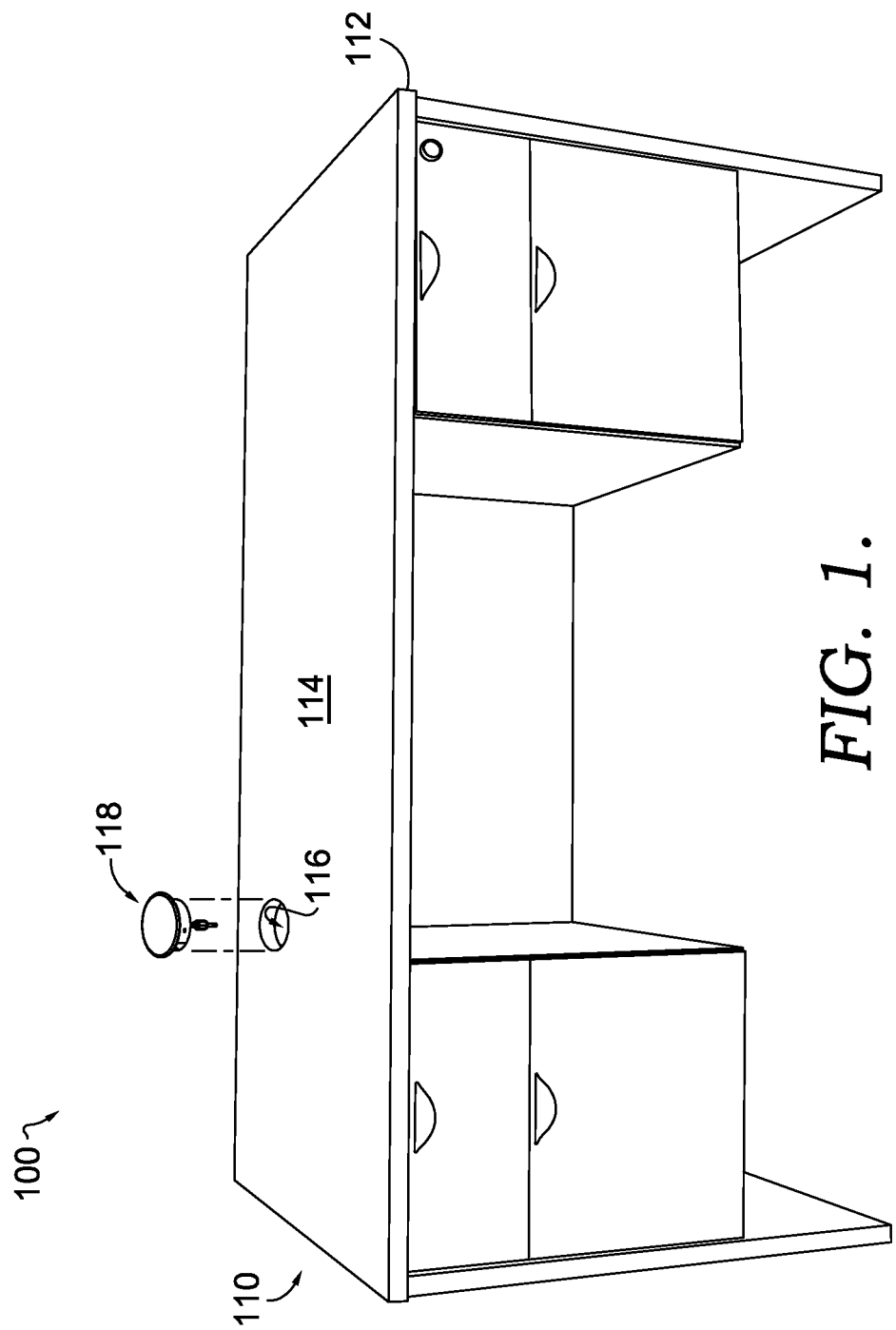
FIG. 1 depicts a partially exploded view of a desk and an inductive charging device in accordance with an embodiment of the present invention.

Turning now to FIG. 1, an exemplary context or environment 100 is depicted in accordance with an embodiment. FIG. 1 depicts a desk 110 having a desktop 112. The desktop 112 includes a top surface 114 (also referred to as a "work surface"). In addition, the desktop includes an underneath-side surface that generally opposes the top surface 114 and that is not viewable based on the perspective provided by FIG. 1. The desktop 112 includes a through hole 116 that extends completely though the desktop 112 and from the top surface 114 to the underneath-side surface. An inductive-charging device 118 is insertable into the through hole 116 to provide inductive-charging functionality. Although FIG. 1 depicts a desk, it should be understood that an embodiment of the present invention is usable in various other contexts and work surfaces, such as in cabinets, shelves, tables, consoles, furniture sidewalls, and the like.

Figure 2A:
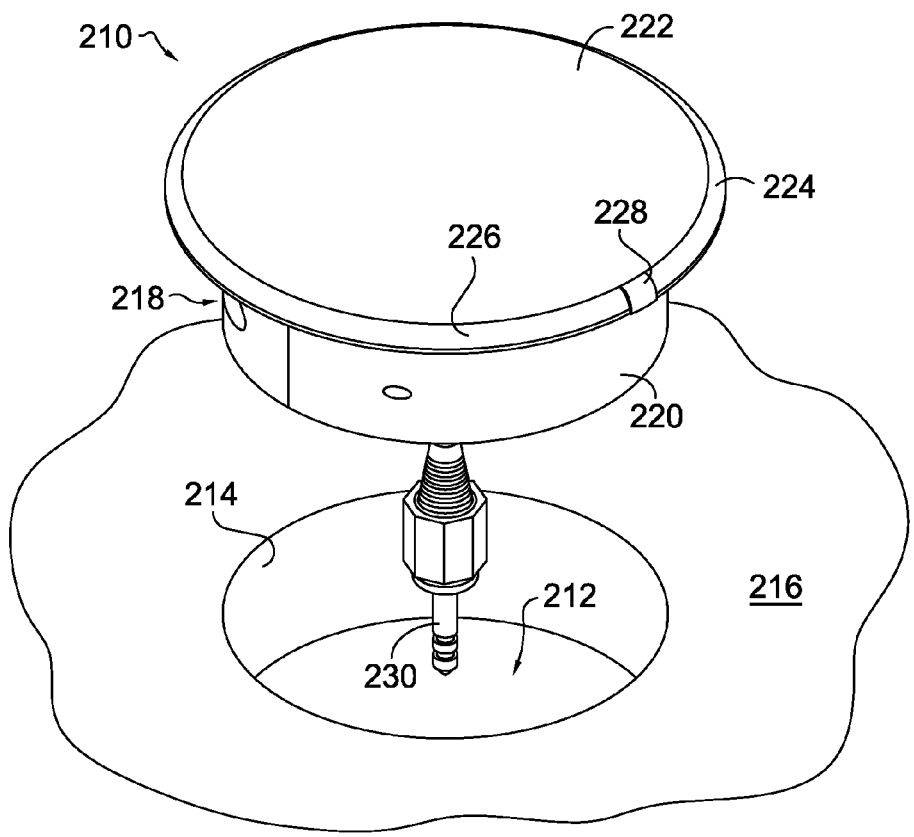
FIGS. 2A and 2B depict an embodiment of the present invention in which a top portion of an inductive-coupling device extends above a desktop work surface when the device is positioned in a through hole in accordance with an embodiment of the present invention.

Referring now to FIG. 2A, an inductive-charging device 210 is depicted above a through hole 212 of a furniture item. The through hole might be one of various sizes and in one embodiment the through hole includes a diameter that is in a range of about 59.9 mm to about 67 mm. Dimensions of the device and the through hole are provided throughout the specification as embodiments of the invention, but the invention is not necessarily limited to those dimensions. Other dimension might be employed without departing from the scope of the claims, unless the claims specifically include a particular dimension. The furniture item includes a wall or panel 214 that has a thickness and a top surface 216. The device 210 includes a housing 218 having one or more walls 220 that are attached to a lid 222. The housing 218 generally provides a compartment to secure and arrange components of the inductive-charging device 212, such as a controller, primary coil, and wiring. FIG. 2A depicts a circular or hockey puck shaped embodiment; however, the housing 218 might have any shape that is designed to match a shape of the through hole.

In addition, the device includes a lip 224 that generally extends outward from the housing 218 and that might be part of the walls 220 or part of the lid 222. The lip 224 includes an underneath-side surface (not viewable in FIG. 2A) that engages the top surface 216 when the housing is positioned in the through hole and a top surface 226 that generally opposes the underneath-side surface.

As depicted in FIGS. 2A, the top surface 226 of the lip 224 might be rounded from a perimeter of the lip 224 inward towards a middle region of the lid 222. Alternatively, the top surface 226 might extend at an angle from a perimeter of the lip 224 inward toward a middle of the lid 222. The rounded or angled shape of the lip can facilitate a relatively gradual and smooth transition from the furniture-item top surface 216 to the inductive-coupling device 210 when the device 210 is positioned in the through hole 212 (such as depicted in FIG. 2B).

The device 210 also includes an LED indicator 228 that illuminates to provide a notification of device functionality. For example, the LED indicator 228 might provide a certain colored light or might blink to indicate when the device 210 is ready to provide inductive charging or is in the process of providing an inductive charge to an electronic device. In one embodiment, the LED indicator 228 is positioned substantially underneath the lip top surface 226 and through a wall of the housing 218. The LED indicator 228 includes wiring (not shown) that connects the LED indicator 228 to the controller inside the housing 218.

FIG. 2A also depicts a power-conducting component 230 that conducts power to the components of the inductive-charging device 210, such as to the controller and the primary coil. The power-conducting component 230 is depicted as a male power jack; however, it might also be a female jack or any other type of suitable power-conducting cable or cord.

Figure 2B:
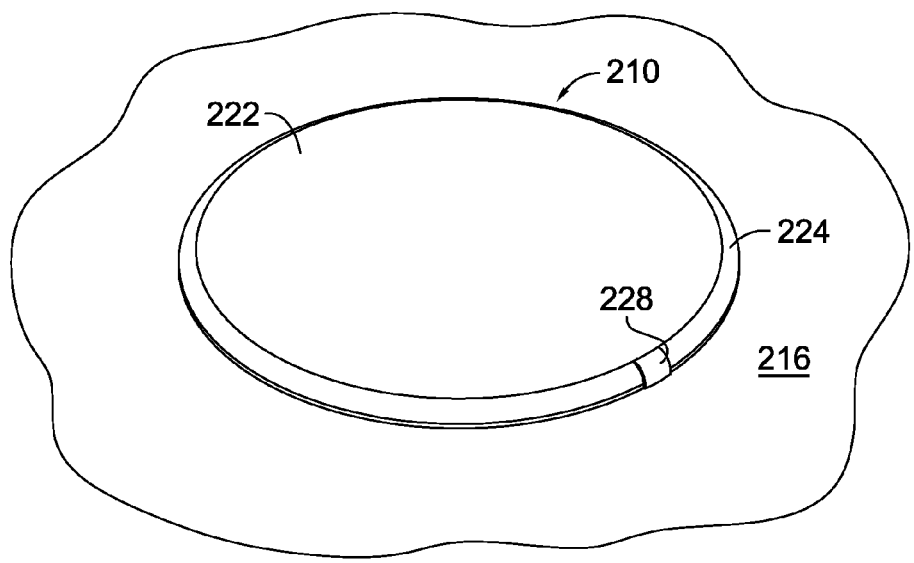

Referring now to FIG. 2B, the device 210 is depicted as mounted in the through hole of the wall or panel. As such, the underneath-side surface of the lip 224 is engaging the top surface 216. The rounded contour of the lip top surface 226 helps to provide a gradual transition between the panel top surface 216 and the lid 222 of the device. In addition, the LED indicator 228 is positioned directly below the lip 224 and above the top surface 216 and is at least viewable from a side of the lip 224.

Figure 3A:
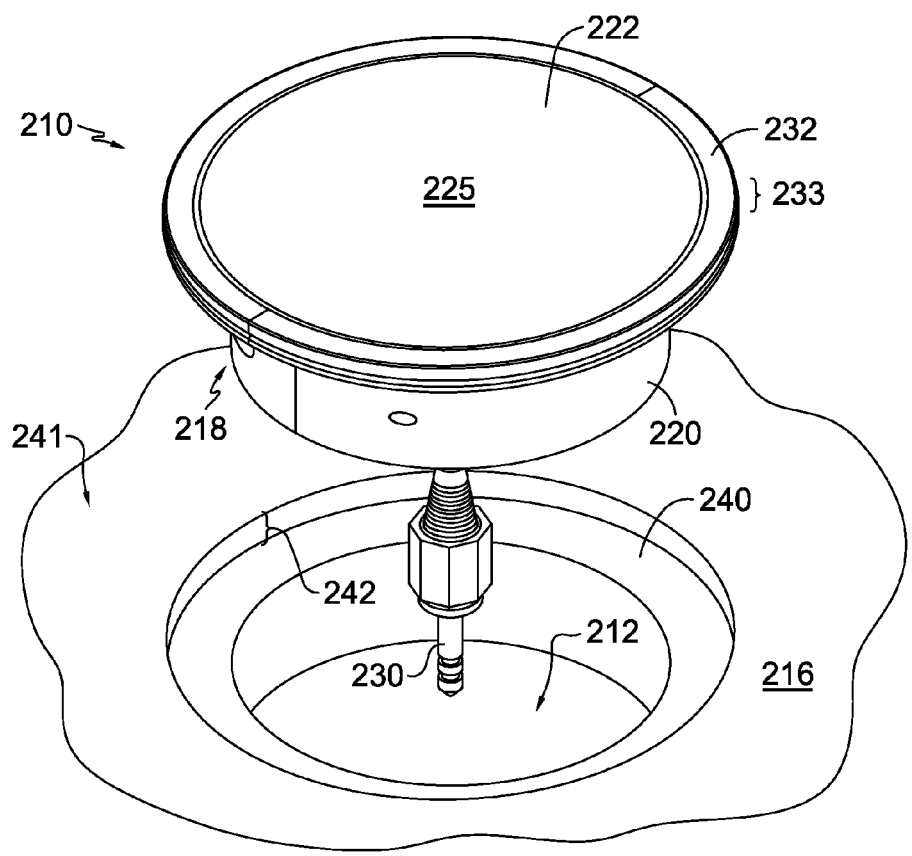
FIGS. 3A and 3B depict an embodiment of the present invention in which a top portion of an inductive-coupling device extends flush with a desktop work surface when the device is positioned in a through hole in accordance with an embodiment of the present invention.
Figure 3B:
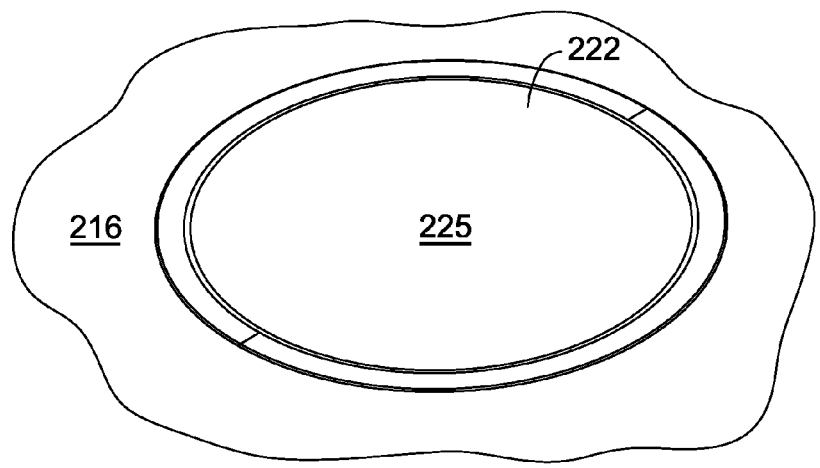

Referring now to FIG. 3A, another embodiment of the present invention is depicted. In FIG. 3A, the through hole 212 is milled to include a different configuration. That is, the through hole 212 includes a counter bore 240 that circumscribes the through hole 212. Counter bore 240 includes a depth 242 that is shallower than a thickness of the panel or wall 241 of the furniture item. For instance, the depth might be about 4.75 mm. In addition, the counter bore 240 includes a diameter of about 80 mm.

The device 210 that is depicted in FIG. 3A is similar to FIGS. 2A and 2B; however, FIG. 3A depicts a ring 232 that engages the lip 224 of the inductive-charging device 210. The ring 232 might engage the lip 224 in various manners. For example, the ring 232 might include a single piece that simply lies directly on top of the lip 224. In such an embodiment, the ring 232 would engage the lip top surface 226. In another embodiment, the ring 232 includes two or more pieces that snap together to attach onto the lip 224. For instance, the ring 232 might include two or more partial-ring segments (e.g., arcs) that snap together to engage the sides of the lip. In a different embodiment, the ring 232 might include a top ring and a bottom ring that connect onto the top and the bottom of the lip to sandwich the lip between the top and bottom rings.

In one embodiment, the ring 232 provides a flush-mount fit for the device 212. That is, the ring 232 fits into the counter bore 240 to allow a top surface 225 of the device lid 222 to be substantially flush with the top surface 216 of the furniture item. That is, the ring 232 includes a height 233 that is substantially similar to the depth 242 of the counter bore 240. As such, when the ring 232 is attached onto the lip 224 of the inductive-charging device 210 and the device 210 is mounted in the through hole 212, the ring 232 and the device 210 sit substantially flush with the surface 216 of the furniture item.

In another embodiment, the ring 232 is constructed of a translucent material that disperses a light emitted from the LED indicator 228. That is, at least part of the ring 232 constructed of translucent material might be illuminated from the light emitted from the LED 228. This feature might enhance the viewability of the LED indicator 228, such as when an electronic device (not shown) is positioned on the inductive-charging device 210 and is at least partially covering the lid 222 or LED indicator 228.

Figure 4:
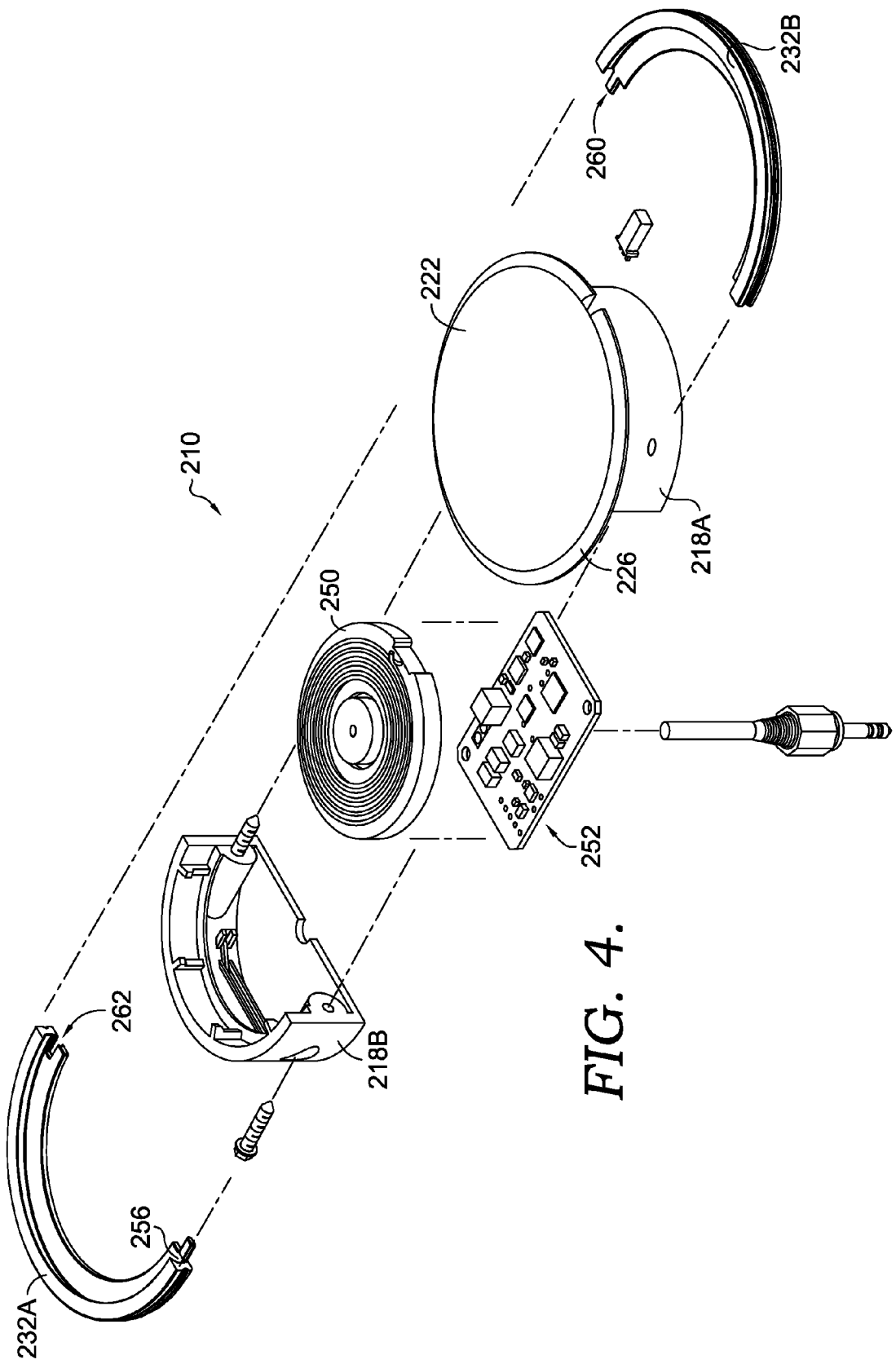
FIG. 4 depicts an exploded view of an inductive-coupling device in accordance with an embodiment of the device.

Referring now to FIG. 4, an exploded view of the device 210 is depicted. The exploded view shows that the housing might be constructed of a first portion 218A and a second portion 218B, and the ring might be constructed of a first portion 232A and second portion 232B. In addition, the exploded view depicts a primary coil 250 and controller 252 that are encased by the housing, together with wiring and other components (not shown).

The ring portions 232A and 232B include an interior-surface profile 256 that is depicted in FIG. 4 as partially rounded. As previously indicated, the lip top surface 226 also includes a rounded profile. In an embodiment of the present invention, the interior-surface profile 256 and the profile of the lip top surface 226 are substantially complementary profiles. As such, the interior surface of the ring portions 232A and 232B fits substantially flush against the lip top surface 226. In a further embodiment, ring portions 232A and 232B include mating components 260 and 262 (e.g., tabs, prongs, and the like) that connect with one another in a releasable manner. As such, the ring 232 is releasably connectable to the lip 224 and to the inductive-charging device 210.

In one embodiment, the invention includes a kit of components that are usable to convert the inductive-charging device from a surface-mount version to a flush-mount version. For example, the inductive-charging device 210 might be provided together with the removably attachable ring 232. The removably attachable ring 232 might be attached to the inductive-charging device 210 to create the flush-mount version when a through hole includes a counter bore (e.g., 240). However, when the counter bore is not provided, the ring 232 might not be connected to the device 210, such that the surface-mount version is created. As previously indicted, in the surface-mount version, the profile or contour of the lip top surface 226 provides a gradual transition from the work surface to the top surface of the lid.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An inductive-charging device that mounts into a through-hole of a furniture item, the device comprising:
   a housing having one or more walls attached to a lid, the one or more walls and the lid at least partially enclosing a compartment;
   a lip radially extending outward from the housing, the lip including an underneath-side surface for engaging the furniture item and a top surface that generally opposes the underneath-side surface;
   a controller mounted in the compartment and at least partially surrounded by the one or more walls and the lid;
   a primary coil coupled to the controller and positioned in the compartment;
   a power-conducting device coupled to the controller for providing power to the primary coil; and an LED indicator coupled to the controller and mounted underneath the top surface of the lip.

2. The device of claim 1 further comprising, a ring that engages, and at least partially circumscribes, the lip.

3. The device of claim 2, wherein the ring includes a material that is translucent and wherein light emitted from the LED indicator passes through the material.

4. The device of claim 2, wherein the ring includes a lip-engaging surface that fits substantially flush against the top surface of the lip.

5. The device of claim 4, wherein the lip-engaging surface of the ring is substantially concave in a radial direction and wherein the top surface of the lip is substantially convex in a radial direction.

6. The device of claim 2, wherein the ring attaches to the lip.

7. The device of claim 6, wherein the ring includes at least a first portion and a second portion that snaps together to attach the ring to the lip.

8. The device of claim 7, wherein the first portion includes a first ring segment and the second portion includes a second ring segment.

9. The device of claim 7, wherein the first portion includes a top of the ring and the second portion includes a bottom of a ring, and wherein the top of the ring engages the top surface of the lip and the bottom of the ring engages the underneath-side surface of the lip.

10. A furniture item that includes inductive-charging features and that comprises:
   a wall having a first surface and a second surface that generally opposes the first surface;
   a through-hole that passes through the wall from the first surface to the second surface;
   an inductive-charging device that is at least partially positioned in the through-hole and that comprises:
      a housing having one or more walls attached to a lid, the one or more walls and the lid at least partially enclosing a compartment;
      a lip radially extending outward from the housing, the lip including lip underneath-side surface that engages the first surface and a lip top surface that generally opposes the lip underneath-side surface;
      a controller mounted in the compartment and at least partially surrounded by the one or more walls and the lid;
      a primary coil coupled to the controller and positioned in the compartment;
      a power-conducting device coupled to the controller; and
      an LED indicator coupled to the controller and mounted underneath the lip top surface.

11. The furniture item of claim 10, wherein the wall includes a counter bore in the first surface that circumscribes the through-hole and that includes a depth less than a thickness of the wall.

12. The furniture item of claim 11 further comprising, a ring that engages the lip top surface and that at least partially circumscribes the lip.

13. The furniture item of claim 12, wherein the ring includes a ring height that is substantially similar to the depth of the counter bore, and wherein a top of the ring and a top of the lid are substantially flush with a work surface of the wall.

14. The furniture item of claim 12, wherein the ring attaches onto the lip top surface and the lip underneath-side surface.

15. The furniture item of claim 12, wherein the ring covers the LED indicator and wherein the ring comprises a translucent material.

16. An inductive-charging device that mounts into a through-hole of a furniture item, the device comprising:
   a housing having one or more walls attached to a lid, the one or more walls and the lid at least partially enclosing a compartment;
   a lip radially extending outward from the housing, the lip including an underneath-side surface and a top surface that generally opposes the underneath-side surface;
   a controller mounted in the compartment and at least partially surrounded by the one or more walls and the lid;
   a primary coil coupled to the controller and positioned in the compartment;
   a power-conducting device coupled to the controller for providing power to the primary coil;
   an LED indicator coupled to the controller and mounted in the lip; and
   a detachable ring that engages the top surface of the lip and at least partially circumscribes the lip.

17. The device of claim 16, wherein the detachable ring includes a translucent material that disperses a light emitted by the LED indicator.

18. The device of claim 16, wherein the LED indicator is coupled underneath the top surface of the lip.

19. The device of claim 16, wherein the detachable ring includes a lip-facing surface that fits substantially flush against top surface of the lip.

20. The device of claim 16, wherein the detachable ring includes a first portion and a second portion that snap together to attach the detachable ring to the lip.

* * * * *